United States Patent [19]

Jannotta et al.

[11] Patent Number: 5,104,056
[45] Date of Patent: Apr. 14, 1992

[54] MOTOR ASSEMBLY

[75] Inventors: Louis J. Jannotta, Orland Park; Raymond C. Reip, Indian Head Park, both of Ill.

[73] Assignee: L&J Engineering Inc., Crestwood, Ill.

[21] Appl. No.: 721,919

[22] Filed: Jun. 21, 1991

Related U.S. Application Data

[63] Continuation of Ser. No. 414,380, Sep. 29, 1989, abandoned.

[51] Int. Cl.$^5$ .................. B65H 75/34; G01B 3/10
[52] U.S. Cl. ........................ 242/167; 33/761; 73/321
[58] Field of Search ............ 242/107, 84.8, 107.4 D, 242/107.4 C, 107.4 B; 33/719, 720, 755, 757, 761; 73/321

[56] References Cited

U.S. PATENT DOCUMENTS

| | | | |
|---|---|---|---|
| 2,945,921 | 7/1960 | Belicka et al. | 242/107 |
| 2,952,155 | 9/1960 | Koehne | 73/321 |
| 2,959,091 | 11/1960 | Richartz | 242/107 |
| 3,085,768 | 4/1963 | Treutelaar | 242/107 |
| 3,148,542 | 9/1964 | Clift, Jr. | 73/321 |
| 3,156,430 | 11/1964 | Zivi | 242/107 |
| 3,337,155 | 8/1967 | Binding | 242/107 |
| 4,756,087 | 7/1988 | Sing | 242/107 X |

OTHER PUBLICATIONS

Shand & Jurs Model 92-020 Gage Head Instructions.
Shand & Jurs Model 92020 Automatic Tank Level Gauge (Brochure).
Installation Instructions for Mounting the Gauging Systems, Inc. (GSI) Negator Cassette (NC) and/or the Dual Calibration Assembly (DCA) within the GSI 2570B and Varec 2500B Mechanical Gauge Head.
Installation of the GSI Negator Cassette Into the S&J 92020A (Instructions).

*Primary Examiner*—Daniel P. Stodola
*Assistant Examiner*—John P. Darling
*Attorney, Agent, or Firm*—Frank J. Uxa, Jr.

[57] ABSTRACT

A motor assembly useful for rotating a drum comprising: a hub adapted to be removably secured to the drum so that the drum rotates in response to rotation of the hub, the hub including a first outer surface adapted to face toward the drum and a second outer surface adapted to face away from the drum; a motor comprising a spring element having a first end adapted to be secured to the hub and being in aligned position relative to the hub to be wound around the hub between the first and second outer surfaces to apply a force to the hub which force urges the hub to rotate in one direction; and a housing adapted to hold the hub and the motor in aligned position substantially without frictional contact with the first and second outer surfaces of the hub.

22 Claims, 3 Drawing Sheets

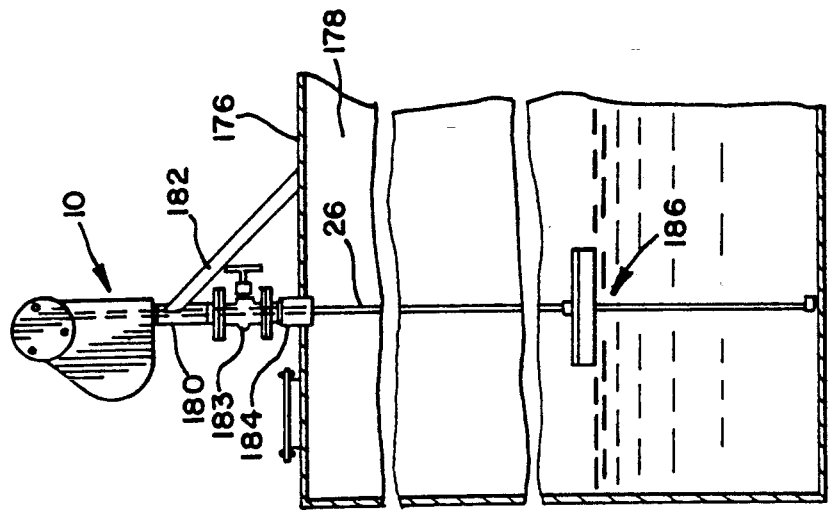
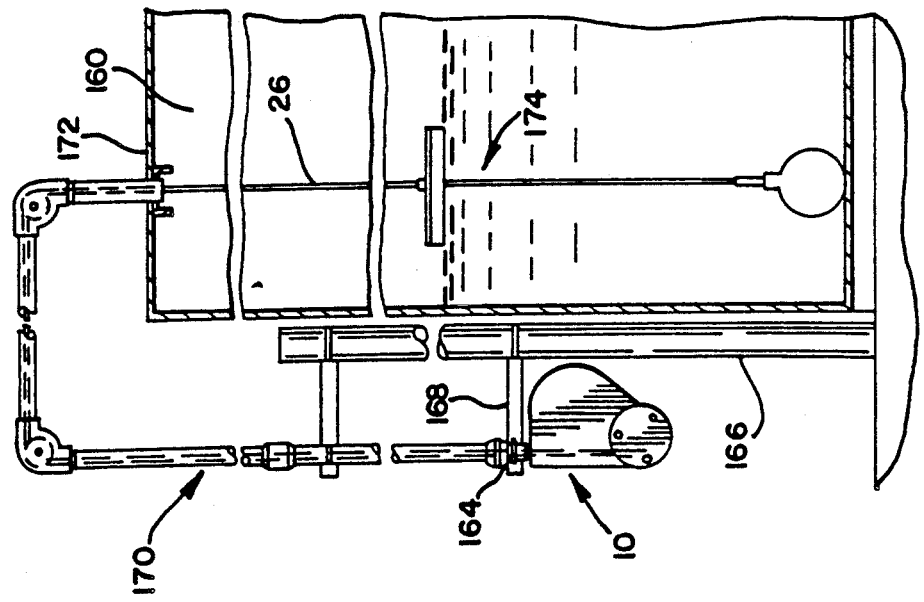

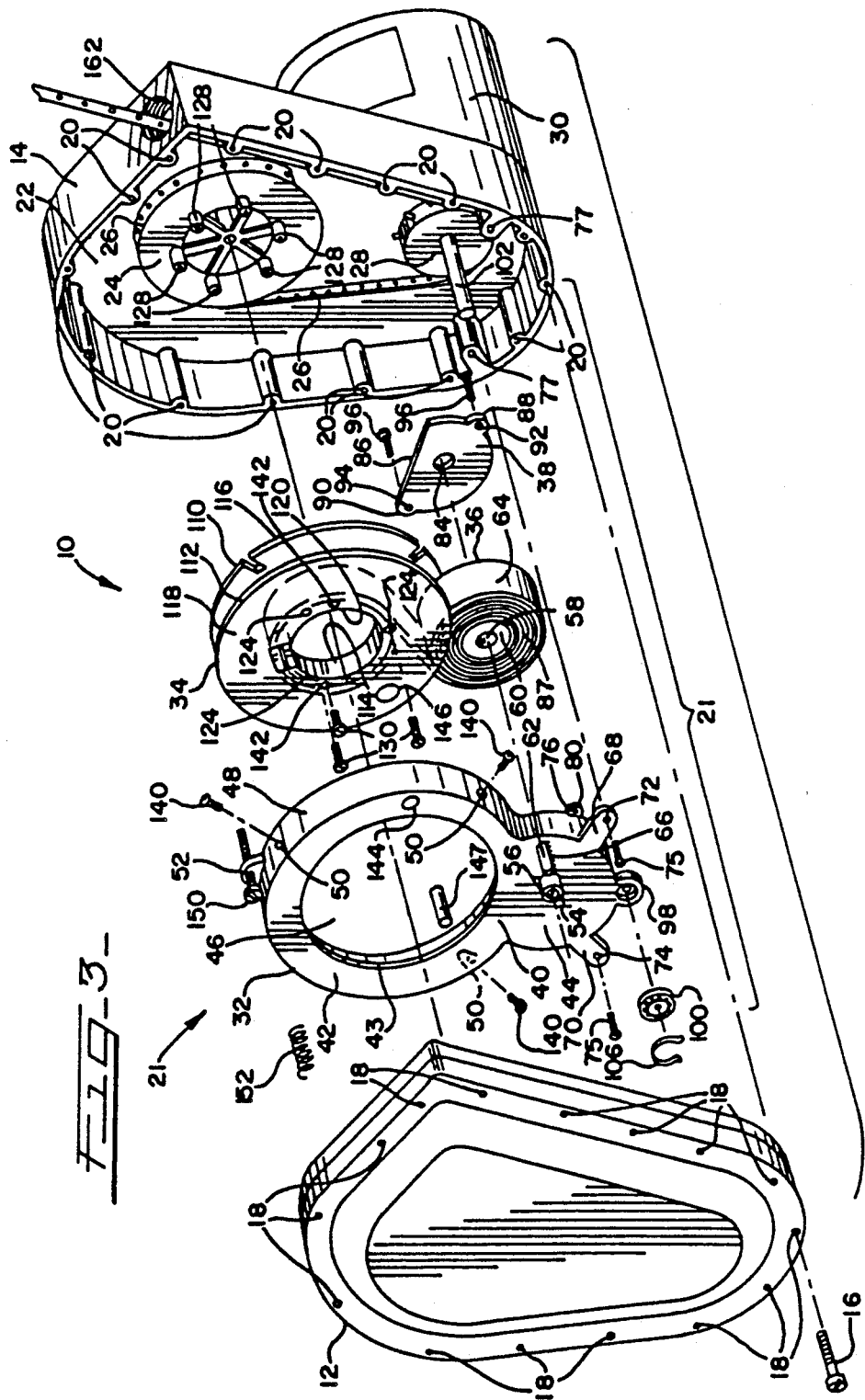

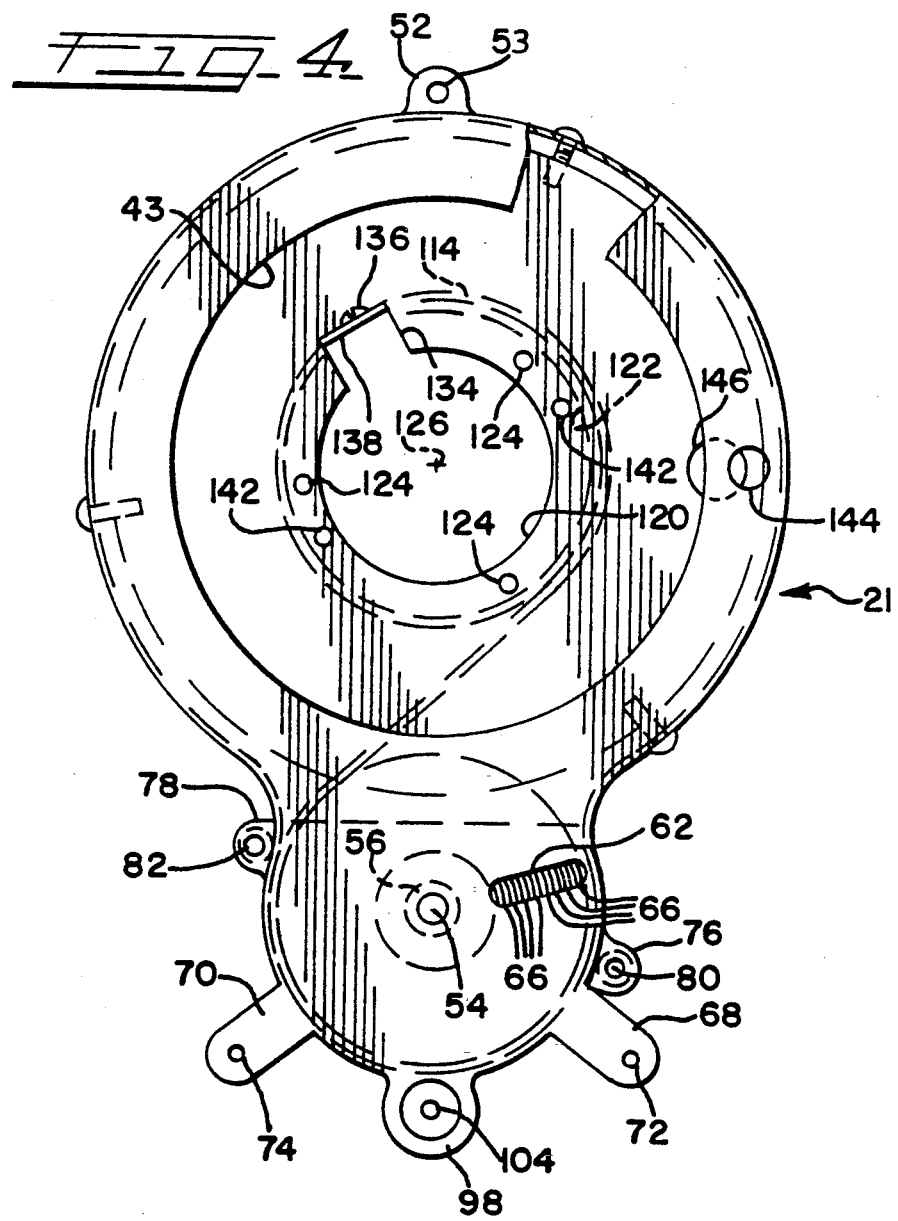

MOTOR ASSEMBLY

This application is a continuation of application Ser. No. 414,380, filed Sept. 29, 1989, now abandoned.

BACKGROUND OF THE INVENTION

This invention relates to motor assemblies, such as constant torque spring motor assemblies. More particularly, the invention relates to motor assemblies which can be preassembled, e.g., in the form of a cartridge, and rapidly, safely and easily installed for effective use in a desired application.

In many applications where a motor is used to perform one or more functions, the motor itself becomes worn or otherwise requires replacement independently of the other system components. In order to avoid excessive downtime and maintain the desired operation, the defective motor should be replaced as quickly as possible. One approach to this problem has been to package the motor assembly as a cartridge unit, making it a relatively easy matter to remove the old motor and replace it with the cartridge unit.

One application in which a motor assembly cartridge is used is in tank gaging systems. Typically, a tank gaging system involves a spring motor, e.g., a substantially constant torque spring motor, which acts directly to apply a force on a spring hub which, in turn, acts to rotate a drum around which the gage tape is wound.

Motor cartridges, such as the spring motor cartridge sold by Gauging Systems, Inc under the trademark GSI-NC currently in use with tank gaging systems have several drawbacks. Such spring motor cartridges include cases which are made of three separate pieces held together by ten or more fasteners, e.g., screws. The aluminum front and back of these cases are both substantially solid, having only two relatively small holes, and cover both the spring motor and the spring hub. This configuration results in several difficulties. First, the large number of fasteners makes the cartridge itself rather difficult to assemble. Further, by substantially enclosing the entire spring motor and spring hub, the cartridge case allows only very limited access to these components. Thus, the spring can be wound or unwound, e.g., during installation, only by using a specially configured crank which fits through one of the relatively small holes.

An additional and important disadvantage of the currently used spring motor cartridges is the friction which occurs between both the front and back of the cartridge case and the spring hub. This friction detrimentally affects the accuracy of the overall tank gaging system. Clearly a new motor assembly cartridge, e.g., a spring motor cartridge, would be advantageous.

SUMMARY OF THE INVENTION

A new motor assembly useful for rotating a drum has been discovered. This assembly is relatively simple, is relatively inexpensive to produce, and can be easily, quickly and safely installed In addition, the housing means, e.g., cartridge case and/or cover, of the present motor assembly is designed to allow accurate initial adjustment of the motor and to have substantially no detrimental effect on the accuracy and/or operation of the overall system, e.g., a tank gaging system.

In one broad embodiment, the present invention is directed to a motor assembly useful for rotating a drum which includes a hub, a motor, and a housing means. The hub is adapted to be removably secured to the drum so that the drum rotates in response to rotation of the hub. This hub includes a first outer surface adapted to face toward the drum and a second outer surface adapted to face away from the drum. The motor comprises a spring element having a first end adapted to be attached to the hub. This spring element is in aligned position relative to the hub so as to be wound around the hub between the first and second outer surfaces of the hub. This motor applies a force to the hub which force urges the hub to rotate, e.g., in one direction. The housing means is adapted to hold the hub and the motor in this aligned position substantially without frictional contact with the first and second outer surfaces of the hub after installation of the motor assembly in its use application. By substantially eliminating the friction between the housing means and the first and second outer surfaces of the hub, the overall amount of friction between the hub and the housing means is substantially reduced Thus, the housing means has little or no detrimental effect on the operation, e.g., rotation of the drum powered by the motor and hub combination and on the accuracy of the overall system, e.g., tank gaging system, of which the drum and motor assembly are parts.

The motor is preferably a substantially constant torque spring motor, such as that conventionally used in substantially constant torque spring motor assemblies for use in tank gaging systems The hub preferably includes a first flange which includes the first outer surface and a spaced apart second flange which includes the second outer surface. These first and second flanges are joined together by a member around which the spring element is wound.

The housing means preferably includes a plurality of projections, e.g., removable projections such as screws, extending into the space defined by the first and second flanges and the joining member These projections, more preferably screws fitted into threaded holes in the housing means, act to hold the hub in place relative to the housing means. The housing means is preferably situated so as to be substantially out of contact with the first outer surface of the hub. The housing means includes a first housing member and a second housing member adapted to be joined together so that the spring element is located substantially therebetween. The housing means preferably includes at least one hole through which the spring element can be wound or unwound around the hub, e.g., through the use of manual force. This hole is relatively large so that no specially configured crank is needed to access the hub for winding or unwinding the spring element. Further, the housing means preferably includes at least one measuring hole, more preferably marked with a scale, positioned relative to the motor to allow a visual determination of how much of the spring element is wound around the hub. This is an important feature in that it provides for the relatively simple, safe and accurate installation of the motor assembly onto a tank gaging system associated with a tank having an amount of liquid which needs to be accurately monitored.

Preferably, the motor includes a hollow core to which the spring element is secured. In this embodiment, the housing means preferably includes a projection adapted to be received in the space defined by this hollow core. In this manner, the spring motor is positioned to rotate about a substantially stationary axis as the spring element is wound or unwound around the hub.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a partial front view, partially in crosssection, of a liquid storage tank employing a gaging system with gage head including an embodiment of the present spring motor cartridge, mounted adjacent the side of the tank.

FIG. 2 is a partial front view, partially in in cross-section, of a liquid-containing storage tank employing a gaging system with an embodiment of the present gage head mounted on the roof of the tank.

FIG. 3 is an exploded perspective view of the embodiment of the gage head shown in use in FIGS. 1 and 2.

FIG. 4 is a front elevation view, partially in cross-section, of certain major components of the assembled spring motor cartridge shown in FIG. 3.

DETAILED DESCRIPTION OF THE DRAWINGS

Referring now to the drawings, a gage head, shown generally at 10, includes a gage head cover 12 and a gage head housing 14 which are joined together by a series of screws 16 (only one shown in FIG. 3) each of which pass through a different one of the holes 18 in cover 12 into a different one of the threaded channels 20 in housing 14. Also included in gage head 10 is a spring motor cartridge, shown generally at 21. Mounted on a shaft affixed to the inside back wall 22 of housing 14 is a tape drum 24 around which is wound a quantity of indexed tape 26. As the tape 26 is wound around or unwound from tape drum 24, it engages and rotates a sprocket wheel 28 which is associated with a measuring mechanism 30 which provides a visual display (e.g., meter reading) of the amount and/or level of liquid in the tank. The gage head 10 is substantially similar to the Shand & Jurs Model 92020 gage head sold by L&J Technologies, Inc. However, as is described hereinafter, spring motor cartridge 21 is adapted to be used with other gage heads, such as the Varec Model 2500 B gage head sold by Varec Co.

The spring motor cartridge 21 can best be described with reference to FIGS. 3 and 4. Spring motor cartridge 21 includes a cartridge case 32, a spring hub 34, a spring motor 36 and a cover element 38.

Cartridge case 32 is produced, e.g., molded, as a single piece and is made of a suitable polymeric material, such as polyethylene. Cartridge case 32 includes a front element 40 which includes a first substantially circular first lobe 42 and a second lobe 44. The first lobe 42 includes a rim 43 which defines a relatively large, centrally located opening 46 that allows access to the spring hub 34 when spring motor cartridge 21 is assembled. A side element 48 extends laterally, substantially perpendicular from, the outer perimeter of front element 40. A series of three threaded holes 50 are located through side element 48, spaced apart from each other by about 120° relative to the center of the substantially circular first lobe 42. A single top extension 52, including a hole 53, extends outwardly from side element 48. Cartridge case 32 includes no back element which corresponds to the first lobe 42 of front element 40.

Second lobe 44 is substantially solid except for two relatively small holes. This solid construction is advantageous in isolating the spring motor 36, e.g., for safety purposes. Second lobe 44 includes a centrally located circular hole 54.

A hollow projection 56 extends from second lobe 44 around hole 54 toward spring motor 36. Hollow projection 56 is received within the central hole 58 of the core 60 of spring motor 36. This combination of hollow projection 56 in central hole 58 assists in anchoring the spring motor 36 to the cartridge case 32.

Further, second lobe includes a generally oblong-shaped hole 62 the length of which extends between the center of second lobe 44 and the outer perimeter of second lobe 44. Hole 62 is sufficiently long to allow a human operator to visually determine how much of the spring element 64 is wound around the core 60 of spring motor 36. In addition, second lobe 44 includes scale markings 66 along the length of oblong-shaped hole 62 so that a human operator can accurately determine the amount, e g., percentage of the total, length and the like, of the spring element 64 which is wound on the core 60 of spring motor 36. Oblong-shaped hole 62 and scale markings 66 are particularly useful in changing/installing spring motor cartridge 21. The human operator can easily determine how much of the spring element 64 needs to be unwound from the spring motor 36 to match the current liquid level in the tank before installing the spring motor cartridge 21 in the gage head 10. Such matching assures that the overall gaging system operates effectively over the entire useful length, e.g., from top to bottom, of the tank without the gage reaching its limits of travel.

Extending radially from second lobe 44 are two spaced apart extensions 68 and 70 which include holes 72 and 74, respectively. These extensions 68 and 70 are useful in securing spring motor cartridge 21 to gage head housing 14. For example, these extensions can be fastened, e.g., using two screws 75 and extended channels 77, to the gage head housing.

Extending from side element 48 are two extensions 76 and 78 including threaded holes 80 and 82, respectively. The extensions 76 and 78 are designed to facilitate the joining of cartridge case 32 to cover element 38 around spring motor 36. Cover element 38 includes a centrally located hole 84 adapted to receive hollow projection 56. Cartridge case 32 and cover element 38 are situated so that when hollow projection 56 is received within central hole 58 of core 60, the side surfaces 87 (only one shown in FIG. 3) of spring element 64 (and the side surfaces of core 60) remain out of contact with cartridge case 32 and cover element 38. This feature facilitates the accuracy of the overall gaging system. Further, cover element 38 includes a truncated top 86 so that the cover element 38 does not contact, or interfere with the rotation of, the spring hub 34. Cover element 38 has two extensions 88 and 90 with holes 92 and 94, respectively. The extensions and holes on cover element 38 are structured to be aligned with extensions 76 and 78 on side element 48 so that two screws 96 can pass through holes 92 and 80, and holes 94 and 82 to secure cover element 38 to cartridge case 32 around spring motor 36.

A bearing mount 98 extends from both second lobe 44 and side element 48, and is adapted to receive ball bearing 100. In the assembled gage head 10, the shaft 102 of sprocket wheel 28 is placed in the hole 104 of bearing mount 98. Ball bearing 100 is placed in bearing mount 98 around shaft 102 and held in place there by clip 106. In this manner spring motor cartridge 21 performs its function substantially without interfering with the rotation of shaft 102.

The spring hub 34 includes a first flange 110, a second flange 112 and a cross element 114 which joins the two flanges together and provides a spool on which the spring element 64 can be wound. First flange 110 includes an outer surface 116 which faces drum 24. Second flange 112 includes an outer surface 118 which faces away from drum 24. Second flange 112 includes a relatively large central hole 120, while first flange 110 includes an even larger central hole 122 which substantially coincides with or is substantially defined by the junction between the first flange 110 and cross element 114.

Second flange 112 includes three (3) holes 124 spaced apart by 120° around hole 120 equidistant from the center 126 of spring hub 34. The drum 24 includes six (6) hollow projections 128 spaced apart by 60° in a circular array. Spring hub 34 is secured to drum 24 by placing these two components in proximity to each other so that the projections 128 pass into the central hole 122 of first flange 110 and into abutting relation to second flange 112 so that three (3) of the projections 128 are aligned with the three (3) holes 124. Self tapping screws 130 are then passed through holes 124 and are secured to the projections 128.

Spring motor cartridge 21 is structured to be useable with other gages, such as the Varec Model 2500B gage sold by Varec Co., without modifying the existing gage. When mounting spring motor cartridge 21 to a Varec Model 2500B gage, the spring hub 34 is secured to the existing Varec gage tape drum by passing the forward portion of the tape drum into central hole 122 and, thereafter, passing a threaded set screw through an existing threaded hole in the tape drum and into secure contact with the cross element 114. Thus, the present spring motor cartridge 21 has the very advantageous feature of being useable with different gage heads, e.g., produced by different manufacturers, without requiring modification to the existing tape drum.

A relatively large spring attachment notch 134 is located in second flange 112. One end of spring element 64 is riveted, using low profile rivet 136, to a metal plate 138 which is then fitted into spring attachment notch 134. In this manner, spring element 64 is secured to spring hub 34. Spring motor 36, which is a constant torque spring motor, is positioned to be aligned with spring hub 34, e.g., as shown in FIGS. 3 and 4.

Spring hub 34 is positioned relative to cartridge case 32 by placing spring hub 34 into case 32 and then passing screws 140 into holes 50 of side element 48 and into the space defined by first and second flanges 110 and 112 and cross element 114. In this manner, spring hub is effectively secured to cartridge case 32 so that the hub will not fall out of the case. However, this arrangement also allows the spring hub 34 to rotate freely relative to cartridge case 32, i.e., without any substantial frictional contact with the cartridge case 32. This is very important since the absence of frictional contact between the cartridge case 32 and spacing hub 34 allows the overall gage assembly to perform its function effectively, e.g., without the accuracy of the gage assembly being unduly influenced by the spring motor cartridge 21.

Two holes 142 in second flange 112 are located in a generally opposing relation relative to the center 126 of spring hub 34. Holes 142 can be used to wind spring element 64 onto spring hub 34, e.g., during installation of spring motor cartridge 21. For example, a screw or other elongated element can be fitted into one or both of the holes 142 to facilitate manual turning of the spring hub 34. Alternately, a bar with ends adapted to be fitted into the holes 142 can be used to manually turn spring hub 34. Thus, no specially designed crank, such as that employed with the GSI-NC spring cartridge, is required to turn the spring hub 34 of the present spring motor cartridge 21.

The spring motor cartridge 21 is assembled as follows. The spring motor 36 is aligned with spring hub 34 and metal plate 138, with the end of spring element 64 riveted thereto, is fitted into spring attachment notch 134. This spring hub/spring motor sub-assembly is then placed in the cartridge case 32. The cover 38 is attached to the case 32 using screws 96, and screws 140 are placed into holes 50 of side element 48 to complete the assembly operation. Spring motor assembly 21 is now ready to be installed in gage head 10.

When it is determined that an installed spring motor cartridge is to be replaced, the gage head cover 12 is removed from the gage head housing 14. The used spring motor cartridge is removed from the housing 14. Spring hub 34 is rotated to wind an amount of spring element 64 onto hub 34 so that the amount of spring element 64 remaining on spring motor 36 is equivalent to the current float level, that is, the distance the float in the tank being monitored is above the bottom of the tank. Once so wound, the spring element 64 is locked against unwinding by aligning hole 144 in cartridge case 32 with aligned holes 146, which pass through both first and second flanges 110 and 112 of spring hub 34, and inserting a pin 147 through all three holes. Spring motor cartridge 21 is positioned so that shaft 102 extends through hole 104 of bearing mount 98. Spring hub 34 is oriented relative to drum 24 so that holes 124 are aligned with three (3) of the projections 128 and is secured to drum 24 using screws 130 which can pass through holes 124 and secured to the aligned projections 128. Ball bearing 100 is fitted into bearing mount 98 and clip 106 is used to hold ball bearing 100 in place. A screw 150 is threaded into hole 53 and comes into contact with back wall 22 of gage head housing 14. A spring 152 is adapted to come into contact with gage head cover 12 when gage head 10 is fully assembled to urge screw 150 into contact with back wall 22. Thus, the combination of screw 150 and spring 152 acts to help anchor spring motor assembly 21 in place in gage head 10. Extensions 68 and 70 are also secured to gage head housing 14, e.g., as described above, to further anchor spring motor cartridge 21 in gage head housing 14. The locking pin 147, is then removed from holes 144 and 146.

Gage head cover 12 is then secured to gage head housing 14, using screws 16, and gage head 10 is ready for use.

FIG. 1 shows gage head 10 in use mounted on the side relative to a storage tank 160. In this embodiment, the indexed tape 26 leaves gage head through threaded hole 162 in the substantially vertical direction. A segment of pipe 164 is matingly engaged into the threaded hole 162, and is mounted to upstanding support 166 using a bracket 168. Pipe segment 164 is secured in aligned relation to a piping network, shown generally at 170, which includes straight lengths, elbows and pulleys. This piping network 170 serves as a conduit for the indexed tape 26 to pass into storage tank 160, through roof 172. Indexed tape 26 is part of the tank gaging system, shown generally at 174, much of which is located inside storage tank 160. Spring motor cartridge 21 performs very effectively in the embodiment shown in FIG. 1.

FIG. 2 shows gage head 10 in use mounted on the roof 176 of a storage tank 178. In this embodiment, gage head 10 is deployed inverted relative to the position shown in FIG. 3. In this embodiment, the index tape 26 leaves gage head 10 through threaded hole 162 in the substantially vertical direction, but downwardly relative to the gage head 10. A segment of pipe 180 is matingly engaged into the threaded hole 162. A support mount 182 is affixed to piping segment 180 and acts to mount gage head 10 onto roof 176. Pipe segment 180 is joined, in aligned relationship to valve 183 and pipe segment 184. Together these components provide a conduit for the index tape 26 to pass into storage tank 178 through roof 176. Index tape 26 is part of the tank gaging system, shown generally at 186, much of which is located inside the storage tank 178. Spring motor cartridge 21 performs very effectively in the embodiment shown in FIG. 2.

While this invention has been described with respect to various specific examples and embodiments, it is to be understood that the invention is not limited thereto that it can be variously practiced within the scope of the following claims.

What is claimed is:

1. A motor assembly useful for rotating a drum located within a gage head housing comprising:
   a hub adapted to be removably secured to the drum so that the drum rotates in response to rotation of said hub, said hub including a first outer surface adapted to face toward the drum and a second outer surface adapted to face away from the drum;
   a motor comprising a spring element having a first end secured to said hub and being in aligned position relative to said hub to be wound around said hub between said first and second outer surfaces to apply a force to said hub which force urges said hub to rotate; and
   a housing adapted to be removably secured to said gage head housing and in which said second outer surface and at least a portion of said motor are located, said housing when secured to said gage head housing holding said hub and said motor in aligned position without substantial frictional contact with said first and second outer surfaces of said hub and holding said hub and said motor in general alignment when located outside said gage head housing.

2. The motor assembly of claim 1 wherein said hub is rotatable relative to said housing without substantial frictional contact between said first and second outer surfaces of said hub and said housing.

3. The motor assembly of claim 1 wherein said motor is a constant torque spring motor.

4. The motor assembly of claim 1 wherein said hub includes a first flange which includes said first outer surface and a spaced apart second flange which includes said second outer surface, said first and second flanges being joined together by a joining member around which said spring element is positioned to be wound.

5. The motor assembly of claim 4 wherein said housing includes a plurality of projections extending into the space defined by said first and second flanges and said joining member.

6. The motor assembly of claim 1 wherein said housing is situated so as to be out of contact with said first outer surface.

7. The motor assembly of claim 6 wherein said housing includes a first housing member and a second housing member adapted to be joined together so that said spring element is located therebetween.

8. The motor assembly of claim 7 wherein one of said first housing member and said second housing member is structured and positioned to be out of contact with said hub.

9. The motor assembly of claim 1 wherein said hub further includes two separate and independent means each for removably securing said hub to a differently configured drum.

10. The motor assembly of claim 1 wherein said housing includes at least one hole through which said spring element is wound or unwound around said hub and said second outer surface includes two spaced apart through holes to facilitate winding and unwinding said spring element around said hub.

11. The motor assembly of claim 1 wherein said housing includes at least one measuring hole marked with a scale and positioned relative to said motor to allow a visual determination of how much of said spring element is wound around said motor.

12. The motor assembly of claim 1 wherein said motor includes a hollow core to which said spring element is secured, and said housing includes a projection received in the space defined by said hollow core.

13. The motor assembly of claim 1 which further comprises locking means including a pin-like element, a hole in said housing and at least one hole in said hub, said holes being alignable and said pin-like element being adapted to be inserted into said aligned holes to lock said spring element against unwinding.

14. The motor assembly of claim 1 wherein said spring element has side surfaces and said housing is positioned to be substantially out of contact with said side surfaces.

15. An assembly useful for winding and unwinding an elongated article located at least partially within a gage head housing comprising:
   a drum rotatable to wind a quantity of elongated article therearound or to unwind a quantity of elongated article therearound;
   a hub removably secured to said drum so that said drum rotates in response to rotation of said hub, said hub including a first outer surface adapted to face toward said drum and a second outer surface adapted to face away from said drum;
   a motor comprising a spring element having a first end secured to said hub and being in aligned position relative to said hub to be wound around said hub between said first and second outer surfaces to apply a force to said hub which force urges said hub to rotate; and
   a housing adapted to be removably secured to said gage head housing and in which said second outer surface and at least a portion of said motor are located, said housing when secured to said a gage head housing holding said hub and said motor in aligned position without substantial frictional contact with said first and second outer surfaces of said hub and holding said hub and said motor in general alignment when located outside said gage head housing.

16. The assembly of claim 15 wherein said hub is rotatable relative to said housing without substantial frictional contact between said first and second outer surfaces of said hub and said housing.

17. The assembly of claim 15 wherein said drum is secured to a stationary gage head housing component.

18. The assembly of claim 15 which further comprises a measuring wheel positioned and structured so as to come into contact with and be rotated by the elongated article as the elongated article is wound onto or unwound from said drum.

19. The assembly of claim 18 wherein said measuring wheel includes a shaft which extends through said housing.

20. The assembly of claim 19 which further comprises bearing means placed around said shaft, said housing includes a first housing member and a second housing member joined together, and said first housing member includes a bearing mount to receive said bearing means.

21. A motor assembly useful for rotating a drum within a gage head housing comprising:

a hub adapted to be removably secured to the drum so that the drum rotates in response to rotation of said hub, said hub including a first flange which includes a first outer surface adapted to face toward the drum and a spaced apart second flange which includes a second outer surface adapted to face away from the drum, said first and second flanges being joined together by a joining member around which a spring element is positioned to be wound;

a motor comprising said spring element having a first end secured to said hub and being in aligned position relative to said hub to be wound around said hub between said first and second outer surfaces to apply a force to said hub which force urges said hub to rotate; and a housing adapted to be removably secured to said gage head housing and in which said second flange and at least a portion of said motor are located, said housing when secured to said gage head housing holding said hub and said motor in aligned position without substantial frictional contact with said first and second outer surfaces of said hub and holding said hub and said motor in general alignment when located outside said gage head housing, said housing including a plurality of projections extending into the space defined by said first and second flanges and said joining member.

22. A motor assembly useful for rotating a drum in a gage head housing comprising:

a hub adapted to be removably secured to the drum so that the drum rotates in response to rotation of said hub, said hub including a first outer surface adapted to face toward the drum and a second outer surface adapted to face away from the drum;

a motor comprising a spring element having a first end secured to said hub and being in aligned position relative to said hub to be wound around said hub between said first and second outer surfaces to apply a force to said hub which force urges said hub to rotate;

a housing adapted to be removably secured to said gage head housing and in which said second outer surface and at least a portion of said motor are located, said housing when secured to said gage head housing holding said hub and said motor in aligned position without substantial frictional contact with said first and second outer surfaces of said hub and holding said hub and said motor in general alignment when located outside said gage head housing; and locking means including a pin-like element, a hole in said housing and at least one hole in said hub, said holes being alignable and said pin-like element being adapted to be inserted into said aligned holes to lock said spring element against unwinding.

* * * * *

UNITED STATES PATENT AND TRADEMARK OFFICE
CERTIFICATE OF CORRECTION

PATENT NO. : 5,104,056
DATED : April 14, 1992
INVENTOR(S) : Jannotta et al It is certified that error appears in the above-identified patent and that said Letters Patent is hereby corrected as shown below:

Column 1, line 60; after "installed" insert --.--

Column 2, line 20; after "reduced" insert --.--

Column 2, line 37; after "member" insert --.--

Column 3, line 8; delete "crosssec" and insert in place thereof --cross-sec- --

Column 3, line 13; delete the second occurrence of "in"

Column 7, line 26; after "thereto" insert --and--

Signed and Sealed this

Twenty-second Day of June, 1993

Attest:

MICHAEL K. KIRK

Attesting Officer

Acting Commissioner of Patents and Trademarks